LONG TRANSIT TIME TRANSMISSION SYSTEM

Filed Jan. 17, 1966 Sheet 1 of 2

INVENTORS
G. B. THOMPSON
S. H. WHITAKER
BY Curphey + Erickson
PATENT AGENTS

INVENTORS
G. B. THOMPSON
S. H. WHITAKER
BY Curphey + Erickson
PATENT AGENTS 3,419,682

LONG TRANSIT TIME TRANSMISSION SYSTEM

Gordon B. Thompson and Stuart H. Whitaker, Ottawa, Ontario, Canada, assignors to Northern Electric Company Limited, Montreal, Quebec, Canada Filed Jan. 17, 1966, Ser. No. 521,028
11 Claims. (Cl. 179—1)

ABSTRACT OF THE DISCLOSURE

A reverberation means added between a talking party's transmitting means and his receiving means in order to return to said talking party a reverberant representation of his speech thereby delaying his psychological acoustic receptiveness to the expected response from a listening party and also masking a certain amount of returned, delayed echo.

Figure 1:
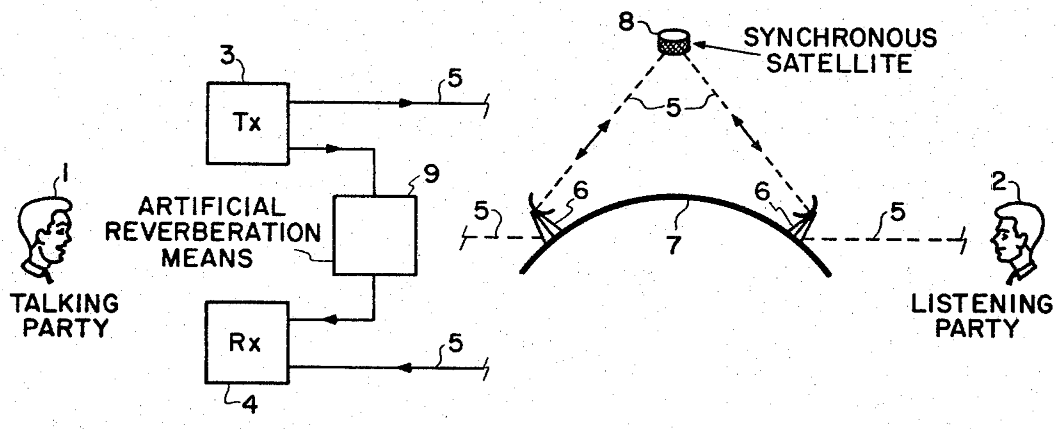

This invention relates to the art of very long distance voice communication systems, and is particularly useful for two channel voice communication systems involving artificial earth satellites, where relatively long periods of time are involved between the transmission of an element of information and its reception.

With the advent of inter-continental telephone calls and artificial earth satellite world-wide communication systems, psychological problems occur which seldom arose with more conventional intra-continental distances. For instance, in a transmission system using synchronous earth satellites as relay points or repeaters, each stationed at the order of 22,500 miles altitude from the earth, a relatively long period of time, called the transmission delay time herein, is required for the transmitted signal, referred to below as a speech signal but not limited thereto, to traverse the communication system; of the order of ⅙ to ½ second for example.

When a talking party at one end of the communication system finishes speaking, during normal conversation he would expect a reply almost immediately. However, in the aforementioned type of system wherein the speech signal takes ⅙ to ½ second to reach the listening party, and the response from the listening party takes a similar length of time to return, the first talking party often becomes impatient at the subjective unnaturally long wait between the end of his speech and his reception of the beginning of the response. Therefore, prior to his reception of the response, the talking party may begin speaking again. The response is received as an interruption to his renewed speech. This often produces annoyance and causes him to stop speaking. The distant listening or second party, receiving the beginning of the second burst of conversation from the first party, ceases answering the first burst of speech signal since he believes that he also has been interrupted. In this way, it may be seen that such a conversation may be comprised of annoyances, interruptions, and gaps of time when neither of the parties are speaking.

In the normal type of communication system, echo is sometimes generated within the system, for instance, by facilities at the ends or along the communication system which do not match the impedance of the transmission system between the two communicating parties. This echo becomes particularly objectionable in a system having a transmission delay time above approximately 50 milliseconds.

In order to decrease the echo, echo suppressors have been inserted in such systems. An echo suppressor usually allows the speech signal to be transmitted from the talking to the listening party, inserting attenuation in the return path to the talking party which carries the echo.

When the listening party begins speaking, the return path is cleared of the attenuation, but attenuation is placed in the first transmission direction so as to reduce echo now transmitted in the other direction.

It has been found that in normal conversation often the listening party gives verbal feedback to the speech by the talking party, in the form of short sounds of acknowledgement, assents, agreements, etc., or he may interrupt him completely. During these interruptions, the listening party expects that both he and the talking party should be talking and listening at the same time for maximum efficiency in communication. However, with the aforementioned type of echo suppressor, when the listening party is emitting his short acknowledgement, etc., the talking party's speech is cut-off from him, and he loses portions of the received sentences. It has been found that such breaks in reception are subjectively disconcerting to the listening party, particularly at the ends of received sentences.

Furthermore, if both parties do speak at the same time, it is sometimes possible to have the echo suppressors at both ends of the communication system "locked up" into their mode of inserting maximum attenuation into both transmission directions, so that neither party can hear the other.

Our invention alleviates the problem of the inter-mixing of the bursts of speech caused by the long transmission delay times encountered in the long distance type of transmission system, by delaying the psychological acoustic receptiveness, of the party who has just finished speaking, to a reply. Thus he tends not to become impatient at the unnatural delay period prior to the reception of the response and tends not to begin speaking again for an appropriate period.

We have invented a communication system between a talking party and a listening party comprising a transmitting means and a receiving means for the talking party, and reverberation means connected between the transmitting means and receiving means for returning only to the talking party a reverberant representation of a speech signal which may be transmitted by him. We have found that such reverberant representation fed back to the talking party achieves the effect of delaying his psychological acoustic receptiveness to the expected response. Since the time between transmission and reception of a reply is at least partially filled with reverberation to the talking party only, we have found that he tends not to impatiently begin speaking again. Also, since there is therefore less tendency for both parties to be speaking simultaneously, there is less tendency for the aforementioned echo suppressor "locked up" situation to occur.

An additional benefit of this invention is that the artificial reverberation helps mask a certain amount of returned delayed echo which may arrive back at the receiver of the talking party during his wait for the expected response to his burst of speech.

Therefore, we have found that in many cases echo suppressors may be deleted from communications systems, and the resulting echo is subjectively masked by the artificial reverberation generated during the use of our invention. Thus, since neither direction of transmission is attenuated, interruptions by the listening party do not result in a break of reception by him.

In this specification, the time from the beginning of a talking party's speech to its end, or to a pause, will be referred to as a "talkburst." Therefore, the two parties at the ends of the communication system hold a conversation in alternate talkbursts.

Figure 2:
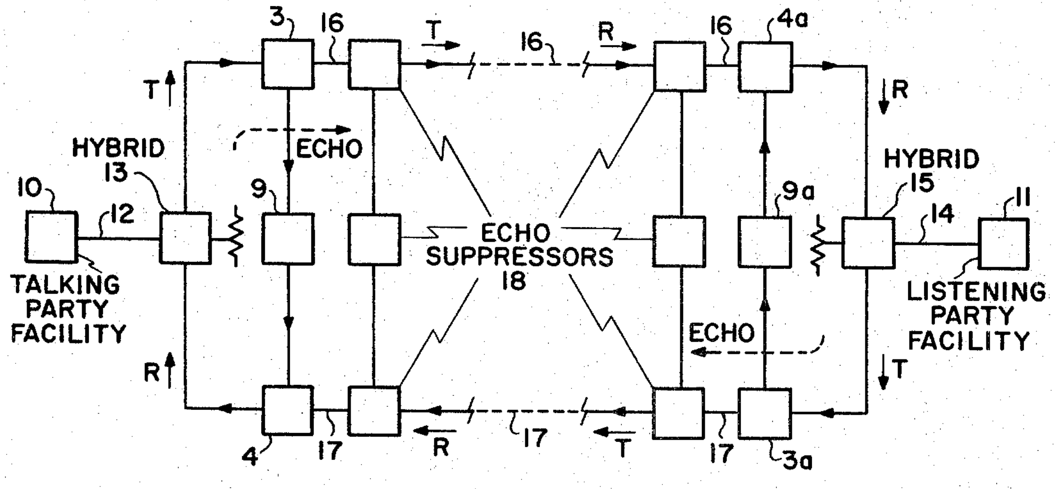
Figure 3:
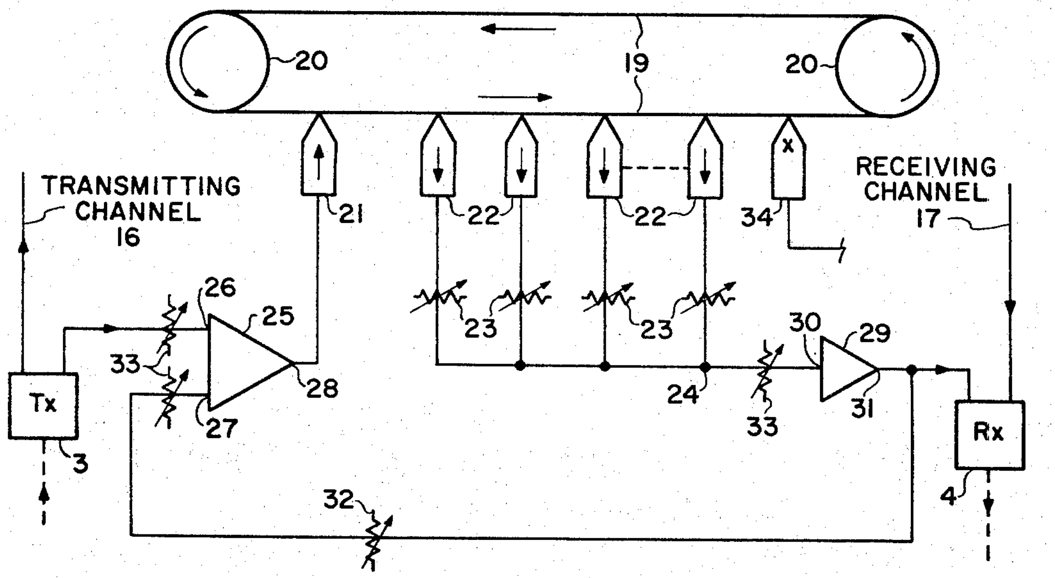
Figure 4:
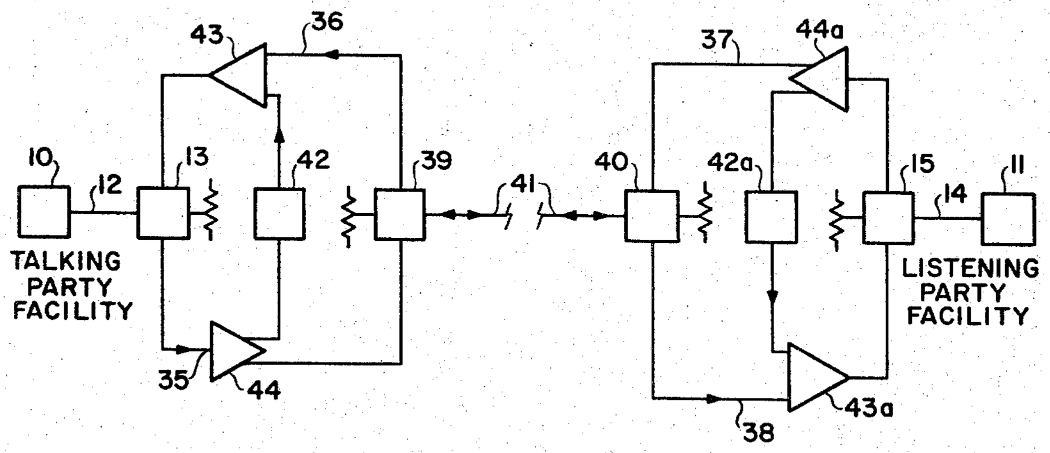

A more detailed description of this invention will be given below, with reference to the following drawings:

FIGURE 1 shows a partial block schematic of a two-channel or four wire communications system between a talking party and a listening party, with facilities at the talking party for utilizing the inventive concepts shown in detail, FIGURE 2 shows a block schematic of a two-channel or four wire communication system between a first and second party wherein both parties have full facilities for utilizing the inventive concepts, FIGURE 3 shows in detail means which may be used to generate artificial reverberation in accordance with the concepts of our invention, and FIGURE 4 shows a two wire system utilizing our invention.

FIGURE 1 shows a well-known communication system between a talking party 1 and a listening party 2. The communication system comprises a first transmitter 3 and a first receiver 4, both for the talking party, and a two-channel (for transmission and reception) transmission system 5 extending between the transmitter and receiver of the talking party and a similar facility (not shown) at the listening party. The transmission system may include a path leading between antennae 6 situated at remote points on the earth 7 and an artificial earth satellite 8 orbiting around the earth 7 synchronously therewith.

It may be seen that with the satellite 8 at an altitude of 22,500 miles, at an approximate speed of electromagnetic transmission of 186,000 miles per second, it would take approximately .25 second for the end of the talking party's talkburst to traverse the distance to the satellite and back to earth, and if the listening party begins a response talkburst immediately after reception of the end of the first, an additional .25 second would be incurred in the return. Therefore, the talking party must wait about ½ second from the end of his talkburst to the arrival of the reply. It has been found that a conversation encountering transmission delays of this order of magnitude causes the psychological problems discussed above, and each party becomes annoyed with interruptions and gaps of time between talkbursts. The problems are compounded where two synchronous satellites are used as relay points in the same transmission system, or between the earth and spacecraft at distances of about this magnitude or greater, or between station facilities on the earth and the moon respectively.

Therefore, in this invention, we employ a facility to delay the psychological acoustic receptiveness of the party who has just finished speaking, to the expected response. In order to accomplish this end, we have provided an artificial reverberation means adapted to be a source of artificial reverberation of the transmitted signal, returned only to the talking party. Therefore, in FIGURE 1, we have shown artificial reverberation means 9 connected between the talking party's transmitter 3 and receiver 4.

The artificial reverberation means generates a constantly overlapping and diminishing series of repetitions of the transmitted talkburst, which at least partially fills the gap of time following the end of the first talkburst and the reception of the reply talkburst from the listening party. Since the talking party only hears the artificial reverberation, the initiation of each of a series of talkbursts tends to be delayed until the reverberation has diminished, allowing time for his talkburst to traverse the transmission system, and for the reply to be returned.

FIGURE 2 shows a more detailed communication system. Shown is the station equipment 10 at the position of the talking party, and the station equipment 11 at the position of the listening party. A two-wire transmission system 12 may interconnect the station equipment 10 with a transmitted and received signal separator, such as a hybrid 13; a two-wire transmission system 14 may similarly interconnect station equipment 11 with signal separating equipment shown as hybrid 15. The separated signals are transmitted between the hybrids 13 and 15 via a four-wire or two-channel transmission system comprising a transmitting channel 16 for the talking party (which is the receiving channel for the listening party), and a receiving channel 17 for the talking party (which is the transmitting channel for the listening party).

As previously discussed, it has been found that echo of the transmitted signal may be generated at the hybrid at the receiving end of the transmission system, and may be returned via the listening party's transmitting channel to the talking part. For this reason, echo suppressors 18 are commonly employed to insert attenuation in the receiving channel of the talking party. For instance, if the talking party at 10 is transmitting, transmission channel 16 would have little or no attenuation inserted in it by the echo suppressor 18, while channel 17 would have a maximum amount of attenuation placed in it, reducing the amount of echo returned to the transmitting party. It will be obvious to one skilled in the acoustics art that without echo suppressors the long delayed echo would be highly annoying, due to the sensation of the talking party speaking against the sound of his own delayed voice echo. Nevertheless, even with the use of an echo suppressor, a small amount is inadvertently returned to him.

FIGURE 2 further shows artificial reverberation means 9 connected between the transmitting channel 16 and the receiving channel 17 of the talking party. The artificial reverberation means is adapted to return only to the talking party an artificially reverberant representation of his transmitted talkburst. Similarly, artificial reverberation means **9*a* is connected between the transmitting channel 17 and the receiving channel 16 of the listening party. Therefore, the artificial reverberation means 9*a*** returns only to the listening party an artificially reverberant representation of his response talkbursts.

The artificial reverberation delays the talking party's psychological acoustic receptiveness to the response expected from the listening party. He therefore does not expect a response as early as he would have had there not been the artificial reverberation. Thus, the response is given time to travel to the talking party and a slow, but smooth conversation ensues.

Deletion of echo suppressors 18 in FIGURE 2 shows the type of system wherein the reverberation means 9 and **9*a* may be used to mask the resulting echo. For instance, if hybrids 13 and 15 which are at the terminations of the four-wire or two channel system do not provide perfect impedance matches thereto, echo of the talking party's speech may be generated in the four-wire circuit 16 and 17, shown as the broken line arrows. The artificial reverberation means 9, connected to the transmitting channel 16, sends back a reverberant representation of the talking party's speech to him due to its connection to the receive channel 17, which is in turn connected to the receiving part of hybrid 13**. However, the returned echo also traverses the receiving channel, and is mixed with the artificial reverberation. Therefore, the artificial reverberant signal masks the echo so as to cause it to be effectively audibly lost within the artificial reverberation.

The talking party believes that the echo is simply an element of the reverberant signal and he disregards it. The listening party is not significantly aware of the artificial reverberation since it is generated for and returned primarily to the talking party, and is attenuated by the hybrid and the talking party's station 10 in the normal manner. Of course, if desirable, the reverberation can also be sent to the listening party as well if the echo returned to his is also objectionable. In this manner delayed echoes arising in the communication system may be advantageously subjectively suppressed.

In determining the amount of reverberation to be used in this invention, a compromise would be made between the amount of reverberation required to delay the psychological acoustic receptiveness of the talking party for a sufficient amount of time, and the optimum reverberation allowable before negative aspects of the reverbation arise. For instance, if the reverberation is made too intense or lasts too long a time, there may arise more annoyance to the talking party than would be caused by the long transit time problem. Therefore, depending on the particular time delay encountered in this system, a subjective compromise must be struck. Well-known tables of acoustic optimum reverberation times for various sizes of rooms which comprises between "acoustic deadness" and "acoustic high reverberation" have been drawn up and may be obtained from standard texts, such as the "Radiotron Designer's Handbook," F. Langford Smith, 4th edition, distributed by Radio Corporation of America, Electron Tube Division, Harrison, N.J. From tables such as these, and with knowledge of the transmission delay time, and subjective tests, an optimum amount of reverberation may be arrived at. For instance, in the transmission facility such as the one shown in FIGURE 1, where the transmission transit time is of the order of .25 second in each direction, a reverberation time of about .35 second may be desirable.

FIGURE 3 shows a reverberation means: an apparatus which may be used to produce artificial reverberation. The reverberation means comprises a storage means, shown as a loop of magnetic recording tape 19 revolving around spindles 20. A signal recording means, shown as recording head 21, is disposed adjacent to the tape so that it may record thereon. Multiple reproduction means for reproducing the recorded signal in a constantly diminishing and overlapping manner from the storage means is shown as a multiplicity of recording tape playback heads 22 disposed against the recording tape 19. The signal is recorded on the recording tape 19 by means of recording head 21 as the tape revolves, and is reproduced sequentially by the nearest reproduction head, the second nearest reproduction head, etc., and the last reproduction head, due to the movement of the loop of tape 19 in a direction from the recording head 21 past the reproduction heads 22. Each of the heads are connected to a common output 24, and a continuous intermingling multiplicity of repetitions of the recorded signal constituting an artificially reverberant facsimile of the original recording signal will appear thereat.

An attenuator 23 is connected between each of the playback heads 22 and common output point 24. Each attenuator attenuates the signal from each of the reproducing heads increasingly as the distance from the recording head increases along the tape.

A standard recording amplifier 25 having a first input 26, a second input 27 and a first output 28 is connected with its input 26 to the transmitter 13 (or transmitter 3 of FIGURE 1, for instance) and its output 28 to the recording head 21. A standard reproducing amplifier 29 having a third input 30 and a second output 31 as connected with its input 30 to the common output 24 and its output 31 to the first receiver 4 (of FIGURE 1, for instance). Level control attenuators 33 may be connected in the first, second and third inputs of the recording and reproducing amplifiers in order to adjust the amplitudes of the signals which traverse the amplifiers. These controls may be within the amplifier structure itself.

In operation, a talking party emits a talkburst which is sent as a signal from the first transmitter 3 via the transmitting channel of the communication system to a listening party. A sample of the transmitted voice signal is sensed in the first transmitter 3 and is sent via recording amplifier 28 to the recording head 21, which records the signal on the cycling loop of magnetic recording tape 19.

As the recording tape 19 cycles past the series of reproducing heads 22, each reproduces the recorded signal and transfers it to the common output 24. Attenuators 23 connected between each of the reproducing heads 22 and the common output 24 may be set so as to adjust the reproduced signals from the reproducing heads 22, such that a pseudo-reverberant representation of the originally recorded signal is reproduced. Preferably, the attenuators 23 introduce an increasing amount of attenuation as the position of the reproducing heads from the recording head increases. The total signal at the common output 24 is transferred via the reproducing amplifier 29 to the receiver 4. Therefore, the talking party hears an artificially reverberant copy of his talkburst, while the listening party hears only the original.

In order to make the reverberation even more realistic, the signal at the second output 31 of the reproducing amplifier 29 is transmitted via reverberation control attenuator 32 to the second input 27 of the recording amplifier 28, and is re-recorded on the recording tape 19.

It may be seen that the time of return of the artificial reverberation is a function of the speed of the recording tape and the distance between the recording head 21 and the closest reproducing head 22. It is preferred, for a more realistic artificial reverberation, to simulate talking conditions in a large room that the speed of the tape and distance between the recording head and first reproducing head be adjusted to allow a 10 to 20 millisecond delay before the return of the artificial reverberation to the talking party.

An erase head 34 may be disposed adjacent the tape between the last reproducing head 22 and the recording head 21 as shown. The erase head erases the recorded signal from the recording tape in preparation for further recording of signal. However, it may be seen that an additional copy of the reproduced reverberant signal at common output 24 is re-recorded via the connection between the output 31 of the reproducing amplifier and the input 27 of the recording amplifier 25. At full strength, an echo would be continued ad infinitum via this connection. However, reverberation control attenuator 32 is inserted to control the reverberation time. Where the communication system transmission delay time is approximately 100 milliseconds, it is preferred that the reverberation time be adjusted by means of reverberation control attenuator 32, to approximately ½ second. Indications also point to the desirability of returning the reverberation stereophonically to the talking party for improved realism to the model of a reverberant room.

It will be obvious to one understanding this invention that other schemes for producing artificial reverberation may easily be devised by one skilled in the art.

Therefore, it may be seen that after the beginning of a talkburst, approximately 10 to 20 millisecond delay occurs before an artificially reverberant copy of the speech is returned to the talking party by the artificial reverberation means. As the artificial reverberation continues, and gradually dies out over a period of approximately 100 milliseconds with this system described, the talking party is psychologically inhibited from further speech. Since during this time his talkburst is traversing the transmission system following which the reply talkburst is traversing the transmission system, it may be seen that the talking party is caused to wait a reasonable length of time prior to further speech. Thus, a smoother conversation ensues. Naturally, when the listening party begins speaking, the roles of talking and listening party are reversed and the same explanation now reverts to the alternate parties.

Although the artificial reverberation means of FIGURE 3 was described with reference to the transmission system of FIGURE 1, it will be obvious that it may also be used with the transmission system of FIGURE 2, where the receiving channel input to the receiver 4 of FIGURE 3 may be transmission channel 17 of the talking party, and the transmitting channel connected to the transmitter 3 of FIGURE 3 is the transmitting channel 16 of the talking party. The artificial reverberation means as connected to the listening party's transmission channels are identical to the just described connections, except that the receiving channel connection is to transmission channel 16, and the transmitting channel connection is to channel 17.

The invention has been described with reference to a two channel or four-wire communication system. However, it is conceivable that the inventive concepts may also be applied to a two-wire system. FIGURE 4 shows such a system. Talking party station equipment 10 is connected via a two-wire transmission system 12 to a hybrid 13, and listening party station equipment 11 is connected via a two-wire transmission system 14 to a hybrid 15. The hybrids 13 and 15 split the two-wire transmission systems 12 and 14 into four-wire transmission systems consisting of transmit channel 35 and receive channel 36 connected to hybrid 13, and transmit channel 37 and receive channel 38 connected to hybrid 15. Transmit and receive channels 35 and 36 are connected to hybrid 39, and transmit and receive channels 37 and 38 are connected to hybrid 40. Hybrids 39 and 40 interconnected by the main long two-wire transmission line 41.

Artificial reverberation means 42 is connected between transmit channel 35 and receive channel 36. A mixing amplifier 43 having two inputs is connected within receive channel 36, one input of which is connected to the hybrid 39 and the other input of which is connected to artificial reverberation means 42. The output of amplifier 43 is connected to hybrid 13. Transmit channel 35 comprises buffer amplifier 44 which may be connected between the input to artificial reverberation means 42 and hybrid 39. However, FIGURE 4 shows an alternative method of connection where buffer amplifier 44 has its input connected to hybrid 13, and two outputs, one connected to artificial reverberation means 42 and the other to hybrid 39.

The four-wire transmission system comprising channels 37 and 38 has a similar circuit to that described above connected between the two channels: artificial reverberation means 42*a*, mixing amplifier 43*a* and buffer amplifier 44*a*.

In operation, a signal transmitted from station equipment 10 via two-wire transmission system 12 is split into the four-wire circuit 35 and 43. The transmitted signal enters buffer amplifier 44 having two outputs, the signal from one output being transmitted via hybrid 39 to two-wire transmission system 41. The signal from the other output is converted into artificial reverberation by artificial reverberation means 42, and then is sent back to the talking party via an input to mixing amplifier 43, the output of which is sent to station equipment 10 through hybrid 13 and two-wire transmission system 12. The response is handled in a similar manner by the similar equipment at the listening party. A response received over transmission system 41 is fed to the second input to mixing amplifier 43 via hybrid 39 and receive channel 36.

It may be seen that mixing amplifier 43 and buffer amplifier 44 are required in each four-wire loop to prevent a continuing non-drying reverberation signal from being produced. Also, these amplifiers may be required for impedance matching purposes, and to prevent losses in the four-wire circuits.

Therefore, it may be seen that echoes arising in such a system are mixed in amplifier 43 with an artificially reverberant representation of the transmitted signal, which subjectively masks it. The response echo is similarly masked by artificial reverberation by mixing in amplifier 43*a*. The artificial reverberation also delays the psychological acoustic receptiveness of the talking party in a similar manner to that described with reference to FIGURES 1 and 2.

The embodiments of the invention in which an exclusive property or privilege is claimed are defined as follows:

1. A communication system between a talking party and a listening party comprising a transmitting means and a receiving means for the talking party, and reverberation means connected between the transmitting means and receiving means adapted to return only to the talking party a reverberant representation of a speech signal which may be transmitted by him.

2. A communication system as defined in claim 1 wherein the time for transit of a signal between the talking party annd the listening party over the communication system is greater than approximately 50 milliseconds; the reverberation means being adjustable to produce a reverberation time such as to delay the psychological acoustic receptiveness of the talking party to an expected response.

3. A communication system as defined in claim 1 wherein an echo of said speech signal which may be generated in the communication system is returned to the talking party by said system; the artificial reverberation means being adjustable to produce a reverberation time and intensity such as to subjectively mask said echo.

4. A communication system as defined in claim 1 wherein the artificial reverberation means is adapted to return reverberation to the talking party after approximately a 10 to 20 millisecond delay.

5. A communication system as defined in claim 1 wherein the time for transit of a signal between the talking party and the listening party over the communication sysem is approximately 100 milliseconds; the artificial reverberation means being adapted to return reverberation to the talking party after about a 10 to 20 millisecond delay with a reverberation time of about ½ second.

6. A communication system between a first party and a second party, wherein a first talkburst may be transmitted via the communication system by the first party to the second party, and a second talkburst may be transmitted via the communication system by the second party to the first party, a first transmitting means and a first receiving means for the first party, and first reverberation means connected between the first transmitting means and the first receiving means for returning only to the first party artificial reverberation of the first talkburst, a second transmitting means and a second receiving means for the second party, and a second reverberation means connected between the second transmitting means and the second receiving means for returning only to the second party artificial reverberation of the second talkburst.

7. A communication system as defined in claim 6 wherein the time for transit of the first or second talkburst to the second or first party respectively over the communication system is greater than approximately 50 milliseconds; the artificial reverberation being adjusted to have a reverberation time such as to delay the psychological acoustic receptiveness of the talking party to the second talkburst.

8. A communication system as defined in claim 2 further comprising echo attenuation means connected thereto for suppression of signal echoes which may be generated in the communication system.

9. A communication system as defined in claim 1 wherein said artificial reverberation means comprises a storage means, a signal recording means coupled to the storage means, and multiple signal reproduction means coupled to the storage means, whereby a sample of a signal which may be transmitted is fed to the signal recording means, and recorded in the storage means, the multiple reproduction means comprising means for repeatedly reproducing the recorded signal from the storage means in a diminishing and overlapping manner so that the reproduced signal appears reverberant; and including means connected to said reproduction means for applying the reproduced signal to said receiving means, and signal erasing means connected to the storage means for erasing the recorded signal from the storage means after it has been reproduced.

10. A communication system as defined in claim 9 comprising variable reverberation control means connected between the signal reproducing means and the signal recording means for returning to the signal recording means an attenuated sample of the reproduced signal.

11. A communication system as defined in claim 9 wherein the storage means comprises a loop of magnetic recording tape, the signal recording means comprises a magnetic tape recording head disposed adjacent to said tape, and said reproduction means comprises a multiplicity of signal reproducing heads disposed adjacent to the tape, each connected through an attenuator to a common output, said tape being adapted to move in a direction from the recording head to said reproducing heads, said attenuator being adjusted to attenuate an output signal from said reproducing heads increasingly as the distance from the recording head increases.

References Cited

UNITED STATES PATENTS

| | | | |
|---|---|---|---|
| 2,584,830 | 2/1952 | Bascom | 179—81 |
| 3,024,309 | 3/1962 | Kleis | 179—1.6 |
| 3,206,559 | 9/1965 | Barney | 179—170.2 |
| 3,351,720 | 11/1967 | Brady | 179—170.2 |

KATHLEEN H. CLAFFY, *Primary Examiner.*

VAN C. WILKS, *Assistant Examiner.*

U.S. Cl. X.R.

179—170.2; 343—180